April 18, 1961  H. H. KOBRYNER  2,980,824
LOAD DISTRIBUTING ARRANGEMENT
Filed June 17, 1957  2 Sheets-Sheet 1

INVENTOR.
HERMAN H. KOBRYNER
BY John M. Calimafde
ATTORNEY

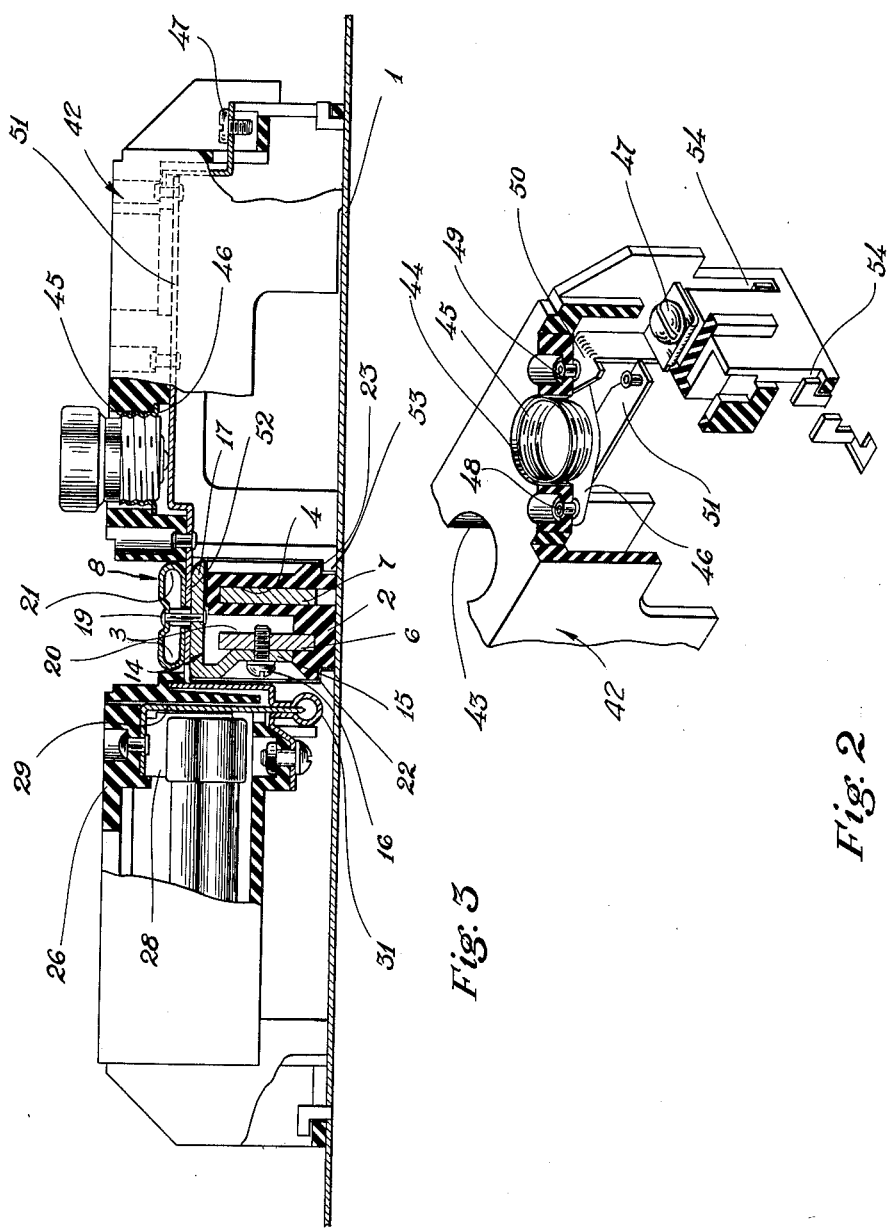

# 2,980,824

LOAD DISTRIBUTING ARRANGEMENT

Herman H. Kobryner, Forest Hills, N.Y., assignor to Murray Manufacturing Corporation, Brooklyn, N.Y.

Filed June 17, 1957, Ser. No. 666,044

10 Claims. (Cl. 317—116)

This invention relates to a load distributing arrangement for a three-wire system (single phase, alternating current, direct current or two phase of a three phase Y system) and more particularly to such an arrangement employing standardized parts of few different kinds, for supplying loads of different capacities.

With the increasing demand for electrical appliances in the home, there has been a search for a simplified load distributing arrangement. For example, one can easily visualize the maze of switches, protective devices and wires required to service the many different loads in an apartment dwelling, and the desirability of a simplified load distribution center.

A simplified load distributing arrangement, if it is to be economical, should use as few different kinds of components as possible which can be easily standardized. There is a general trend in the electrical industry today towards constructional standardization, in order to reduce retooling and stocking costs, as well as to simplify the substitution of parts at the distribution center. This type of construction is known generally as "modular construction."

It is an object of this invention to provide such an arrangement comprising relatively few different parts which may easily be connected to and disconnected from the distribution panel, and permits simple substitution of one part for another without requiring a change in the panel arrangement.

It is a further object of this invention to provide components of novel construction which permit simplifying the load distributing arrangement.

It is a feature of this invention to provide a bus-bar retaining block assembly of unique and simple construction.

It is still a further feature of this invention to provide a first protective device for limiting the current from a pair of bus-bars, at opposite potential, to a load, and which device is in electrical contact with the busses and is locked simply and easily to the retaining block and panel, to prevent inadvertent removal.

It is still a further feature of this invention to provide a second protective device which is similarly locked to the retaining block, bus panel, and which is adapted to limit the current from one bus-bar to one or more loads.

In accordance with an aspect of my invention, there is provided a load distributing arrangement for preferably a single-phase, three-wire system, comprising a bus-bar retaining block of insulating material mounted rigidly to a panel. A pair of bus-bars are mounted in parallel slots in the block and connected to two of the three wires; the two wires being at opposite potential and the third wire being a neutral conductor, whereby the voltage across said bus-bars is twice that across either of said bus-bars and the neutral conductor. Connector members are provided, connected alternately to opposite bus-bars but arranged similarly across the top of the block, whereby adjacent connectors as seen from the top of the block are connected to opposite bus-bars. A first protective device, comprising a pair of contact members, adapted to contact adjacent connectors, is provided for limiting the current from the bus-bars to a load. A second protective device, comprising only one contact member is provided for limiting the current from either bus-bar to a second load. The housings for the respective devices comprise at one end thereof, means for engaging the block, and at the other end thereof, means for engaging hook members on the panel, whereby the devices are securely locked to the block, busses and panel.

The above-mentioned and other features and objects of this invention and the manner of attaining them will become more apparent and the invention itself will be best understood by reference to the following description of an embodiment of the invention taken in conjunction with the accompanying drawings, wherein:

Fig. 2 is a detailed cross-sectional view of a portion of one type of protective device utilized in conjunction with the panel; and Fig. 3 is a side view of two different kinds of protective devices adapted to protect loads of different capacities and shown connected to the bus-bars and locked to the bus-bar retaining block and panel.

Figure 1:
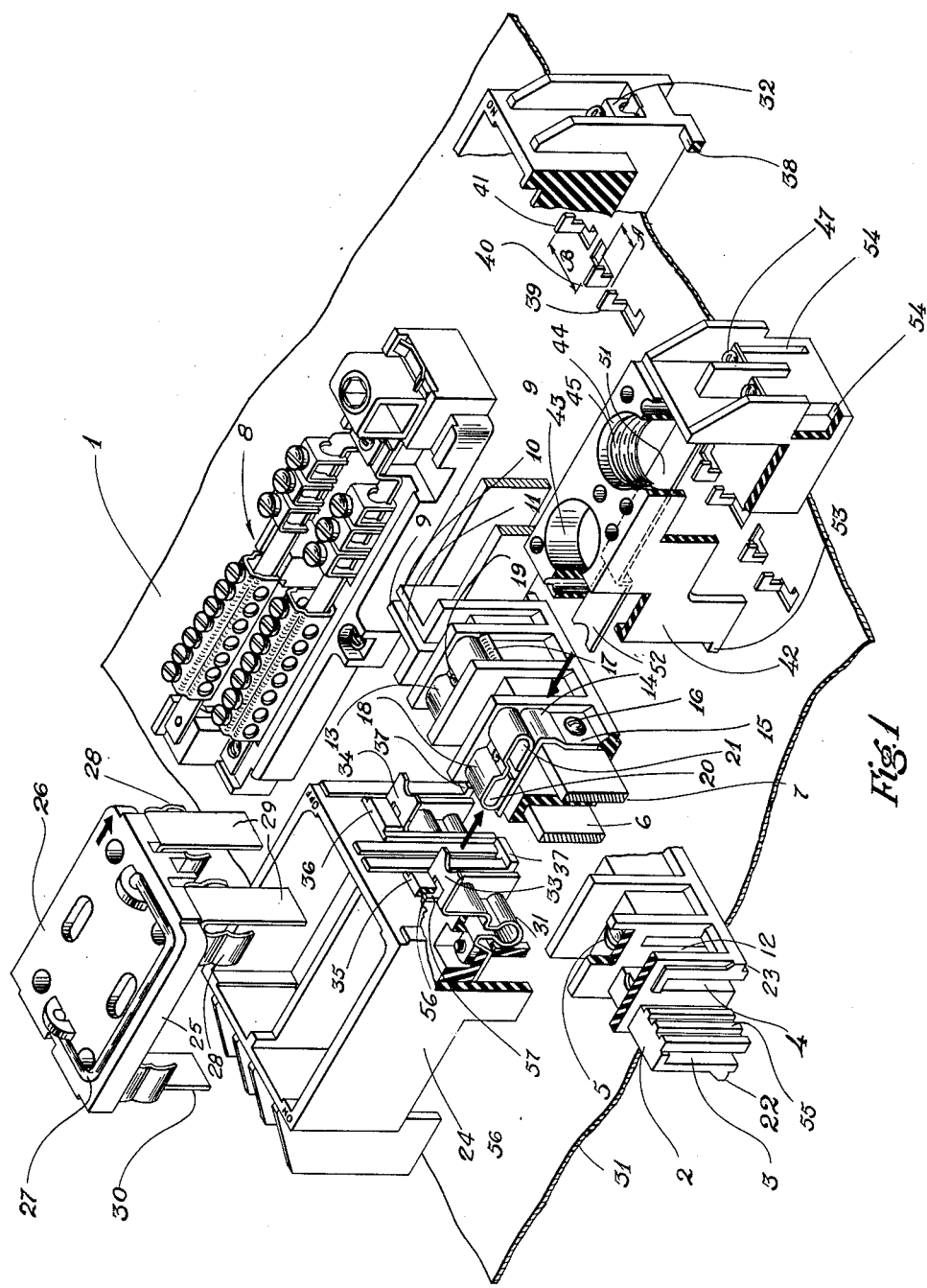
Fig. 1 is a perspective view of the load distributing panel forming an embodiment of my invention.

Referring now to the figures, and particularly to Fig. 1, there is illustrated a load distributing arrangement for a single-phase, three wire system.

My novel arrangement comprises a panel 1, preferably made of metal, and if desired covered with a sheet of insulating material, not shown.

Mounted on the panel is a bus-bar retaining block 2, made of a suitable insulating material. The block is provided with a pair of parallel slots 3, 4 extending longitudinally thereof. The block 2 is mounted to the panel 1, by means such as screws 5 passing through the block and engaging tapped holes in the panel 1.

As shown, the slots 3, 4 lie in planes which are perpendicular to the panel 1.

A pair of flat bus-bars 6, 7, preferably copper, are mounted in the slots 3, 4 respectively, and are for connection to two of the three wires, which are at opposite potential, whereby the voltage across the bus-bars 6, 7 is twice that across either bus-bar and the third wire (neutral conductor).

Connectors for the neutral conductors are shown at 8, and are also mounted by suitable means on the panel 1.

The block, at one end, comprises extensions 9, 10, which are separated by a slot 11; the extensions serve as spacers for the bus-bars and increase the length of the air-gap between the bars to provide the necessary separation which is required between busses at opposite potential. As shown, the ends of the bars, at the entrance to the block, extend at an angle to the remaining portion of the bars (preferably at right-angles) so that the outside surfaces of the bars are separated a maximum distance.

If a main disconnect device is employed, which has been omitted from the figure since it does not constitute part of my invention, the bus-bars 6, 7 are connected to the two load connectors, of opposite polarity, of the main disconnect. Where the main disconnect is not employed the bus-bars are connected to the main lugs.

The block 2 is slotted on opposite sides, preferably at regular intervals, to remove segments and expose the bars; for example, as seen at 12. The slots on one side are preferably positioned halfway between the slots on the other side.

Mounted in the slots are angle-shaped connector members, 13, 14, etc. each taking the form of an inverted L when mounted. The dimensions of the slots are similar and chosen such as to accommodate snugly one part, for example, 15, of the L-shaped connectors. This part 15, of the respective connectors is brought into firm contact with the exposed portion of the bus-bar by means such as screws 16. The bus-bars are provided with tapped holes to engage the screws; thus, when the connectors are connected to the bars, the bars are immovably locked in the block.

The L-shaped connectors include a second part 17 which overlies, or extends across the top of the block to the opposite sides thereof. Thus, adjacent overlying connector parts 17 are connected to opposite bus-bars 6, 7.

The purpose of the connectors is to provide connections between the line side terminals of the protective devices to be described hereinafter, and the bus-bars. For this purpose, each of the connectors is equipped with either two screws (not shown) or a contact spring 18. If screws are employed on the connector, the line terminals on the switches take the form of forked-prongs.

I prefer the contact spring fitting because it simplifies the making of connections between the protective devices and the bus-bars.

The contact spring is centrally attached to the connector, preferably by means of a rivet 19 and comprises a pair of oppositely disposed loops 20, 21. Each of the loops 20, 21 forms with the underlying connector surface a spring clip, whereby connection may be made to the bus-bars from either side of the block 2.

For reasons which will become clear from the following discussion, the block 2 is provided with recessed or undercut portions 22, 23 which extend a given distance up from the panel.

It should now be apparent that if the full voltage across the bus-bars is desired, a protective device making contact with adjacent spring clips should be employed, and if half the bus-bar voltage is desired, a protective device making contact with only one bus-bar should be employed in conjunction with the neutral conductor. In accordance with my invention, I provide protective devices suitable for such purposes.

To protect a load requiring full bus-bar voltage, for example, 220 or 250 volts, I provide a pull-out type protective device or switch having a base portion 24 and a puller portion 25 (Fig. 1). The puller portion 25 is conventional comprising an insulator cover 26, handle 27, fuse jaws 28 and two pairs of switch blades 29 and 30 respectively. In Fig. 3 the fuse jaws are shown holding a cartridge type fuse. The base portion 24 comprises an insulator housing in the shape of an open box and two pairs of spring clips (one pair of which is shown at 31) which engage the two pairs of switch blades 29 and 30 respectively. The load side spring clips (not shown) are connected respectively to terminal connectors, one of which is shown at 32, Fig. 1. The line side spring clips 31 are preferably extended and terminated by prongs, or blade portions 33, 34, for making contact with the adjacent spring clips connected to the opposite bus-bars. Therefore, the spacing between the clips corresponds to the spacing between the adjacent connectors. The prongs 33, 34 are secured to the underside of ledge-type projections 35, 36 on the housing by means of lips 56 extending from the prongs 33, 34 into slots 57 in the ledge-type projections or by other suitable means, passing from one member to the other. If desired, instead of the extensions being integral with the spring clips, separate members may be utilized although less satisfactorily, and connected to the clips.

The housing of the base portion 24, at the line end thereof, is provided with extensions 37 in the shape of foot-like portions. The foot-like portions are preferably provided on both sides of each of the clip extensions 33, 34 and are of such dimensions as to fit snugly into the undercut portions of the block.

The opposite end of the housing for the device includes a slot, half of which is shown in the partial, sectional view of the base at the right-hand side of Fig. 1. The slot is terminated to leave a section 38 of the base which is engaged by a pair of hook members 39, 40 formed up from the panel 1.

The panel is provided with a plurality of such hook members aligned in two parallel rows on opposite sides of the block 2 respectively. As seen in Fig. 1, the hook members are formed-up so that the spacing between the successive members alternates between two different lengths. For example, considering hook member 39 first, the next successive member is 40 separated from 39 by distance A. The next member is 41 separated from member 40 by distance B. The succeeding member (not shown) would be separated from member 41 by the distance A—and so forth.

The protective device is connected to the bus-bars by placing it appropriately on the panel so that the contact blades 33, 34 are aligned with the desired spring clips 13, 14. Sufficient clearance is provided under the housing to clear the hook members which should be aligned with the slot. The pair of hook members which are more closely spaced, for example, 39, 40, are adapted to engage the base portion 38 of the pull-out device. The device is then slid forward so that the contact blades enter the spring clips in which position the foot-like portions of the device base will have entered the undercut portion of the block and the pair of hook members will have engaged the other end of the base portion. The slot, of course, is of sufficient length to permit this required movement of the device. In this position the device is securely locked to the panel against a force perpendicular to the panel; for example, the force required to remove the puller portion from the base portion of the device.

The load distributing arrangement is also adapted to accommodate a second type protective device which is designed to protect a pair of loads requiring only half the voltage across the bus-bars. This device is a two-branch plug-fuse unit comprising an insulator housing 42 having two circular holes 43, 44, in which two flanged metal rings are installed, one of which is shown at 45. The rings are threaded for receiving the plug fuses. Each of the flanges 46 of the rings 45 serves respectively for mounting and for connection with a load terminal 47 (Fig. 3). The flanges are secured to the housing by rivets or screws, for example, 48, 49. Rivet 49 may serve also to connect a load terminal lead 50 to the flange 46. Underneath the two plug fuse holes, a flat metal bar 51 is mounted and secured to the opposite ends of the housing by any suitable means. The bar 51 is positioned so that when the plug fuses are screwed into the rings, their end, or button contacts press against the bar.

The bar 51 is extended at 52, beyond the line end of the housing, for connection to the connector spring clips.

The base of the housing also includes foot-like extensions 53 on both sides of the blade 52 and a pair of slots 54 at the opposite end of the housing. The slots 54 are separated so as to accommodate the more widely spaced pairs of hook members, for example, 40, 41.

The essential components of my invention have now been described; these components are the bus-bar retaining block assembly, the two different kinds of protective devices and the means for locking the devices to the panel. It should be apparent that a plurality of one or both kinds of devices may be employed simultaneously on the panel. Further, a second block may be joined to the first block at an extension 55, thereby increasing the number of devices which may be connected to one panel assembly. The extension 55 is of a predetermined length so that the connectors on the succeeding block are regularly spaced relative to the connectors on the first block.

Further, if desired, additional blocks may be mounted to the panel disposed at different angles, it being essential only that hook members be appropriately provided and spaced.

It is to be realized also that although I have made reference to a "panel," in practice the panel may be a mounting plate, a sub-base or the bottom of an enclosure consisting of a box, cover and door. The bottom of the box is provided with a desired number of tapped holes and two parellel rows of formed-up hooks (assuming one block is to be utilized).

The tapped holes serve for mounting the main disconnect, or a main terminal block, the neutral, and the bus-bar and block assembly.

The cover is provided with rectangular twist-outs having dimensions slightly greater than the outline of the plug-fuse device. When a plug-fuse device is installed and a corresponding twist-out removed, the upper part of the device protrudes slightly through the opening.

When a pull-out device is installed, two adjacent twist-outs are removed, the width of the pull-out device being approximately twice the width of a plug-fuse device.

At the start of the description, reference was made to the possible use of an insulating sheet for covering the panel. By providing insulating means between the panel and the spring clips connected to the base of the pull-out device, the clips may be located closer to the panel, thereby permitting a reduction in the height of the device, and accordingly, the enclosure.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A load distributing arrangement comprising a panel, a bus-bar retaining block of insulating material, including a pair of parallel slots extending longitudinally of the block, means rigidly mounting said block to said panel, a pair of bus-bars mounted in said slots, a plurality of angle-shaped connectors, means connecting successive connectors alternately to opposite bus-bars, the connectors being shaped and positioned so that a portion of each connector overlies said block and extends to opposite sides thereof, whereby adjacent connector portions on top of said block are connected to opposite bus-bars, said block including recessed portions extending a given distance from the panel along the opposite sides of said block, a first protective device comprising a pair of contact members separated so as to contact adjacent connector portions, a second protective device comprising a contact member positioned to contact one of said connectors, respective housings for each of said devices, each housing having an extension at one end along the bottom thereof, for fitting snugly in said recessed portion of said block, and means securing the opposite ends of said housings to said panel when the housings are positioned so that said extensions lie in the recessed portions, whereby said housings are locked at both ends to said panel.

2. The arrangement according to claim 1, wherein each of said connectors is in the shape of an inverted L, one leg of the L overlying said block and the other leg thereof fitting snugly in a slot in said block, the slots being provided in opposite sides of said block and being of sufficient depth to expose the adjacent bus-bar, means rigidly connecting said other legs to the adjacent bus-bars, whereby said bus-bars are immovably locked in said block, and the slots for successive connectors being off-set relative to each other, whereby adjacent overlying portions of successive connectors are connected to opposite bus-bars.

3. The arrangement according to claim 1, wherein said first device is a pull-out type switch comprising a base portion and a puller portion; said base portion comprising a box-shaped housing, the top thereof being open, two pairs of clips mounted at the bottom of said box at the opposite ends thereof, one pair of clips being integral with said contact members, the other pair of clips being for connection to load conductors, said extension comprising foot-like portions disposed on both sides of each of said contact members, and said puller portion comprising a cover for said box and two pairs of contact blades attached to said cover and positioned to enter said clips respectively.

4. The arrangement according to claim 1, wherein said second protective device comprises a housing including a pair of circular openings in the top thereof, a pair of receptacles mounted respectively in said openings for plug-type fuses, a flat conductive bar integral with said contact member and mounted underneath the receptacles such that the end terminals of the inserted fuses contact said bar, respective leads connected to the fuse receptacles for connection to a pair of load terminals, and said extension comprising foot-like portions disposed on both sides of said contact member.

5. A load distributing arrangement comprising a panel, a bus-bar retaining block of insulating material, rigidly mounted on said panel, and including a pair of parallel slots extending longitudinally of the block, each of said slots lying in a plane perpendicular to said panel, a pair of bus-bars mounted in said slots, said insulating block being slotted on opposite sides to expose the adjacent bus-bars, the slots on one side being off-set relative to the slots on the opposite side, a plurality of connector members, each comprising a first part mounted snugly in one of said slots and connected rigidly to the exposed bus-bar and a second part extending across the top of said block, whereby adjacent second parts of said connectors are connectors to opposite bus-bars, said block including recessed portions extending a given distance from the panel along the opposite sides thereof; a first protective device comprising a pair of contact members separated so as to contact adjacent second parts of said connectors, a second protective device comprising a contact member positioned to contact the second part of one of said connectors, respective housings for each of said protective devices, each housing having an extension at one end along the bottom thereof, for fitting snugly in said recessed portion of said block; and means for securing the opposite ends of said housings to said panel when the housings are positioned so that said extensions lie in the recessed portions, whereby said housing are locked at both ends to said panel.

6. The arrangement according to claim 5, and further comprising a plurality of spring contacts mounted respectively on the top surfaces of the second parts of said connectors, each of said spring contacts including a pair of oppositely disposed loops, each loop forming with the underlying surface of the connector a spring clip for receiving one of said switch contact members.

7. The arrangement according to claim 5, wherein said means for securing the opposite ends of said housings to said panel comprises a plurality of hook members on said panel, aligned in two parallel rows on opposite sides of said insulating block respectively and spaced a given distance therefrom, each hook member comprising a first portion extending upright from said panel and a second portion extending at right-angles to said first portion in a direction away from said block, adjacent hook members being spaced such that respective pairs thereof are adapted to fit into slots in said housings, and the respective housings having a portion of such height as to fit snugly under the second portion of said hook members when said housings are moved towards said block.

8. A load distributing arrangement comprising a panel, a bus-bar retaining block of insulating material including a pair of parallel slots extending longitudinally of the block, each of said slots lying in a plane perpendicular to said panel, means rigidly mounting said block to said panel, a pair of bus-bars mounted in said slots, said insulating block being slotted on opposite sides at regular intervals to expose the adjacent bus-bars, the respective slots on one side lying midway between adjacent slots on the opposite side, a plurality of inverted L-shaped connectors, one leg of the L extending across the top of said block and the other leg thereof fitting snugly in a slot in said block, means rigidly connecting said other legs to said adjacent bus-bars, whereby said bus-bars are immovably locked in said block, a plurality of spring contacts mounted respectively on the top surfaces of said connectors comprising a pair of oppositely disposed loops, each loop forming with the underlying surface of the connector a spring clip for receiving a blade contact member, whereby a plurality of spring clips are disposed on both sides of said block and adjacent clips are connected to opposite bus-bars, said block including undercut portions extending a given distance from the panel along the opposite sides of said block; a first protective device comprising a pair of blade contact members separated so as to engage adjacent spring clips on either side of said block, a second protective device comprising a blade contact member adapted to engage one of said spring clips on either side of said block, respective insulator housings for each of said devices, each having an extension along the bottom thereof, for fitting snugly in said undercut portion of said block; a plurality of hook members on said panel aligned in two parallel rows on opposite sides of said insulating block respectively and spaced a given distance therefrom, each hook member comprising a first portion extending upright from said panel and a second portion extending at right-angles to said first portion in a direction away from said block, adjacent hook members being spaced such that respective pairs thereof are adapted to engage said housings through slots provided therefor at the ends opposite from said extensions, whereby the respective housings are locked at both ends thereof to said panel.

9. The arrangement according to claim 8, wherein said first protective device is a pull-out type switch comprising a base portion and a puller portion; said base portion comprising a box-shaped housing, the top thereof being open, two pairs of clips mounted at the bottom of said box at opposite ends thereof, one pair of clips being integral with said blade contact members, the other pair of clips being for connection to load conductors, said extension comprising foot-like portions disposed on both sides of each of said blade contact members, the opposite end of said base portion being of such height as to fit snugly under the second portion of said hook members, the slot in said housing for said hook members being of sufficient length to permit the base portion to be placed on said panel, over said hook members, and moved toward said block so that said foot-like portions slide into said undercut portion and said hook members embrace said base member; and said puller portion comprising a cover for said box and two pairs of contact blades attached to said cover and positioned to enter said clips respectively.

10. The arrangement according to claim 8, wherein said second protective device comprises a housing including a pair of circular openings in the top thereof, a pair of receptacles mounted respectively in said openings for plug-type fuses, a flat conductive bar integral with said blade contact member and mounted underneath the receptacles such that the end terminals of the inserted fuses contact said bar, respective leads connected to the fuse receptacles for connection to a pair of load terminals, said extension comprising foot-like portions disposed on both sides of said blade contact member, the opposite end of the housing having a portion of such height as to fit snugly under the second portion of said hook members, and the slots in said housing being of sufficient length to permit the housing to be placed on said panel, over said hook members, and moved towards said block so that said foot-like portions slide into said undercut portion and said hook members embrace said base member.

References Cited in the file of this patent

UNITED STATES PATENTS

| | | |
|---|---|---|
| 1,736,028 | Winklehaus | Nov. 19, 1929 |
| 1,740,862 | Haney | Dec. 24, 1929 |
| 2,103,069 | Frank | Dec. 21, 1937 |
| 2,230,423 | Bassette | Feb. 4, 1941 |
| 2,647,225 | Cole | July 28, 1953 |
| 2,733,386 | Myers | Jan. 31, 1956 |
| 2,739,272 | Norden | Mar. 20, 1956 |
| 2,790,113 | Brown | Apr. 23, 1957 |
| 2,837,699 | Fore | June 3, 1958 |
| 2,869,043 | Locher | Jan. 13, 1959 |
| 2,902,631 | McRoberts | Sept. 1, 1959 |